Figure 4:
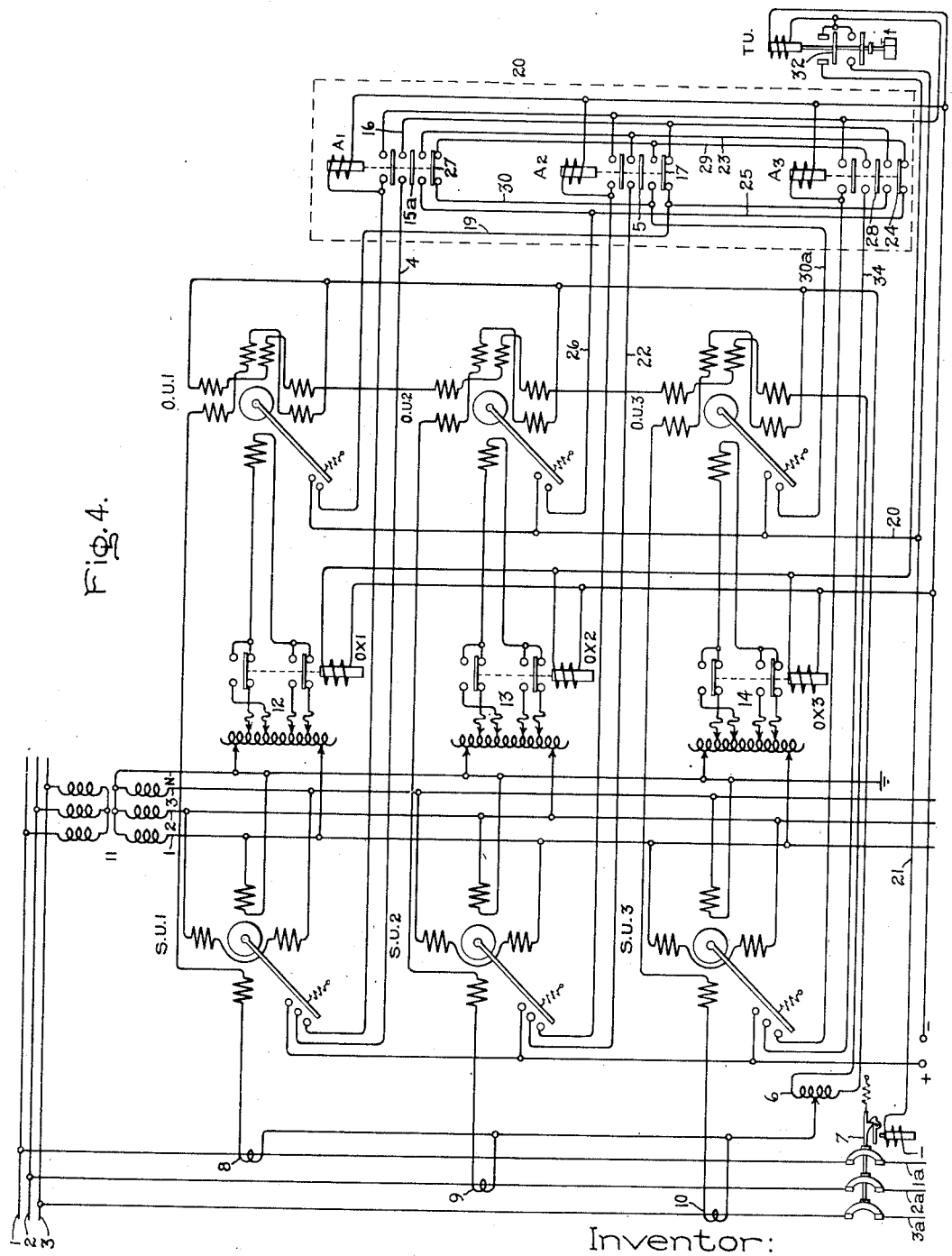

Feb. 5, 1952     A. R. VAN C. WARRINGTON     2,584,765
DISTANCE RELAY PROTECTIVE SYSTEM
Filed June 4, 1949     3 Sheets-Sheet 1
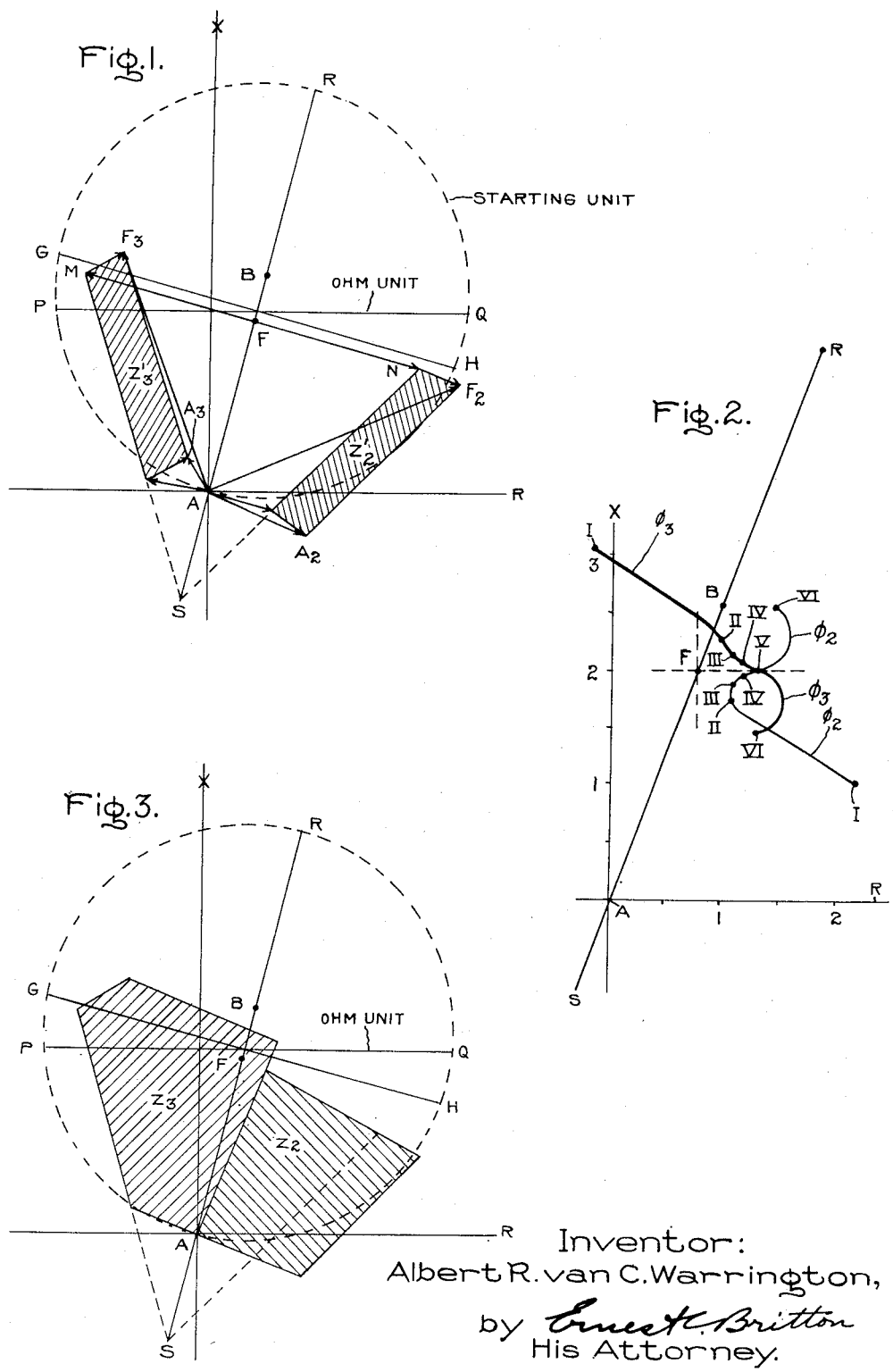
Inventor:
Albert R. van C. Warrington,
by *Ernest H. Britton*
His Attorney.

Feb. 5, 1952     A. R. VAN C. WARRINGTON     2,584,765
DISTANCE RELAY PROTECTIVE SYSTEM
Filed June 4, 1949     3 Sheets-Sheet 3

Inventor:
Albert R. van C. Warrington,
by Ernest C. Britton
His Attorney.

Patented Feb. 5, 1952

2,584,765

UNITED STATES PATENT OFFICE 2,584,765

DISTANCE RELAY PROTECTIVE SYSTEM

Albert R. van C. Warrington, Wallingford, Pa., assignor to General Electric Company, a corporation of New York Application June 4, 1949, Serial No. 97,296

5 Claims. (Cl. 175—294)

This invention relates to electric protective relays of the distance type and more particularly to an arrangement for protecting electric power systems against both ground and phase fault conditions.

Heretofore, it has been the practice to protect electric power systems against ground fault conditions by one set of distance relays whose only function was to protect the system against such fault conditions, and to provide another set of relays whose only purpose was to afford protection for the system against phase fault conditions.

I have found that protection which is adequate in certain systems can be provided for both phase and ground fault conditions by a single distance relay system. More specifically, I utilize a conventional single phase ground directional distance relay of the reactance type on each line conductor of the power circuit because its distance measurement is not affected by circuit resistance which, in ground faults, may be considerable. Such conventional ground relays inherently measure distance properly during single line to ground faults and also when a phase to phase fault occurs involving all phases because in this latter instance the electrical quantities are symmetrical. When a phase to phase fault occurs involving two phase conductors, however, or when a double line to ground fault occurs, the distance measurements of the two relays associated with the two conductors involved in the fault depend upon the distribution of the positive and zero sequence currents. If $C$ is the ratio of the positive sequence current that flows in the relay to the total positive sequence current flowing into the fault, and if $C_0$ is a similar ratio for the zero sequence current, then the relay associated with each of the two faulted phase conductors will measure the distance to the fault correctly only if the sources of zero phase sequence current are so located with respect to the particular relays as to cause $C$ to be about half $C_0$.

Since $C$ and $C_0$ are usually comparable in magnitude, it follows that $C$ is of greater magnitude than one-half of $C_0$ in the usual case. Consequently, in the usual case, the relay associated with the lagging one of the faulted phase conductors tends to underreach somewhat, i. e., this relay measures a greater number of ohms than the actual distance to the fault would indicate, and the relay associated with the leading one of the faulted phase conductors overreaches, i. e., this relay measures a smaller number of ohms than the actual distance to the fault from the relay would indicate. If the relays are set to protect 90% of the particular line section against single line to ground faults, the relay associated with the leading phase conductor might operate its interrupting device in response to a double line to ground fault condition or for a phase to phase fault involving two phase conductors which would be beyond the protected line section. Hence, undesired tripping would occur. The relay associated with the lagging phase conductor would afford protection during faults involving two phase conductors for some substantial portion of the line less than 90%, such as 70% or 80%, for example.

Where the relays are remote from sources of generation and close to a source of zero sequence current so that the zero sequence current component of the relay current preponderates, $C$ may be less than one-half $C_0$, and the relay associated with the lagging phase conductor may overreach while the relay associated with the leading phase conductor may underreach when a fault occurs involving two phase conductors. This condition is of no importance for faults within the section since it is immaterial which of the two relays associated with two phase conductors involved in the fault trips the interrupter, but if a fault occurs just beyond the end of the protected section it is important that neither relay should overreach and trip wrongly. Fortunately the impedance of the protected section of line tends to reduce the disparity between $C$ and $C_0$ so that it is rare that this condition would cause the relay associated with the lagging phase conductor to overreach.

Thus, in accordance with my invention, means are provided in the usual case for blocking the relay associated with the leading one of two faulted phase conductors when a fault occurs involving two phase conductors but not the relay associated with the lagging one of the two faulted phase conductors, and in the above described rare case where the relay associated with the lagging phase conductor overreaches, such relay is blocked. The blocking means would be connected at the time of installation so as to block the overreaching relay whether such relay happened to be associated with the leading or the lagging phase conductor and the connections would not have to be changed. Since the underreaching ground relay affords protection which is substantially equivalent to the protection afforded the protected portion of the power system by phase relays for faults involving two phase conductors, it is possible by my invention to obtain, by a single system of single phase ground relays, a degree of protection which is the substantial equivalent of the protection normally afforded power systems by employing both a system of ground relays and a system of phase relays.

An object of my invention is to provide a protective arrangement for electric power systems which affords protection against phase and ground faults by means of a single relay system which is adapted to operate in response to ground faults and phase faults occurring in the power system to perform a desired control operation.

Other objects and advantages of my invention will become apparent as the description proceeds and the features of novelty which characterize my invention will be pointed out with particularity in the claims annexed to and forming a part of this specification.

Figure 5:
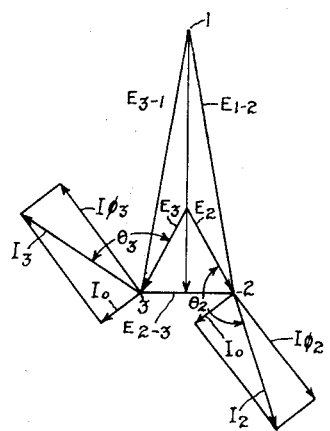
Figure 6:
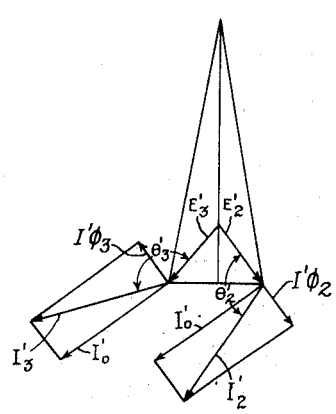
Figure 8:
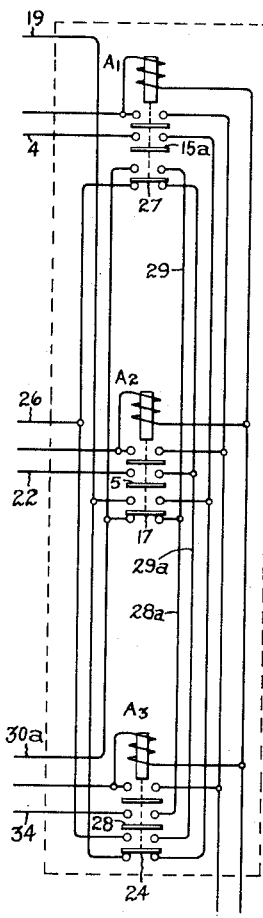
Figure 7:
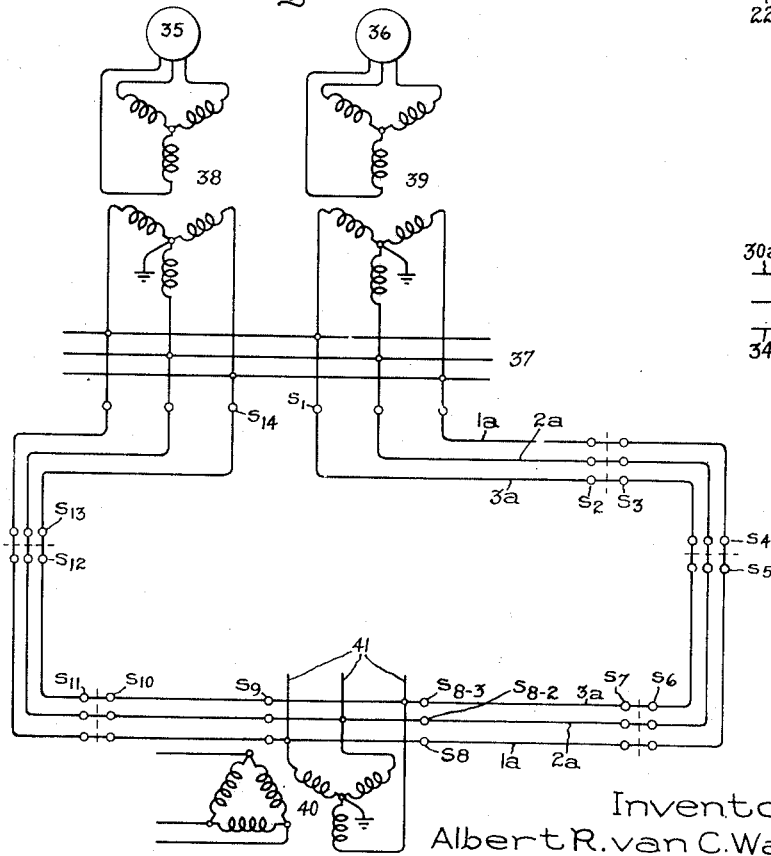

For a better understanding of my invention, reference may be had to the accompanying drawings in which Fig. 1 is an impedance diagram to aid in understanding the principles involved in my invention and is applicable to a phase to phase fault condition; Fig. 2 is an impedance diagram which shows graphically the error in impedance measurements made by ground directional distance relays when a double line to ground fault occurs; Fig. 3 is an impedance diagram similar to Fig. 1 and is applicable to double line to ground fault conditions; Fig. 4 is a schematic diagram of a protective arrangement embodying my invention; Fig. 5 is a vector diagram which is representative of conditions when two phases are faulted which cause the relays associated with the leading and lagging phases to overreach and underreach respectively; Fig. 6 is a diagram similar to Fig. 5 and represents conditions causing the relays associated with the leading and lagging phases to underreach and overreach respectively; Fig. 7 is a schematic diagram showing various relay locations to illustrate conditions which determine the distance measuring characteristics of the relays when two lines are faulted; and Fig. 8 illustrates an arrangement similar to Fig. 4 for blocking the lagging phase when two lines are faulted.

In Fig. 1, the line AB represents the impedance of a protected line section whereon the point F is an arbitrarily selected fault location. The line BR represents a portion of the system which is beyond the line section AB. The line SA represents a portion of the power system in back of the relays located at station A which relays afford protection for line section AB. The circular impedance characteristic which is shown partially dotted and partially in solid lines is the impedance characteristic of the mho type starting units located at station A. The line PQ represents the impedance characteristics of the ohm units associated with the relays at station A.

Should a single line to ground fault occur at point F on phase 1, for example, the ohm unit associated with phase 1 would measure the distance AF correctly and because the point F is inside the characteristic circle of the starting mho unit and below the characteristic line PQ of the ohm unit, a tripping operation would be initiated as is known in the art.

Assuming the usual conditions, i. e., where the leading phase relay overreaches when the phase rotation is 1, 2, and 3, the apparent impedance measured by the ohm unit associated with phase 2 would be located at point $F_2$ and the apparent impedance measured by the ohm unit associated with phase 3 would be located at point $F_3$ for a phase to phase fault between conductors 2 and 3 which in reality would be at a distance from the relays which is indicated by the line AF. The point $F_2$ can be located by determining the impedance error FN and also the error $NF_2$ due to the fault resistance. The impedance error for phase 3 is represented by the vector FM and the vector $MF_3$ represents the error due to arc resistance so that point $F_3$ represents the impedance which is apparent to the relay associated with line 3 for a fault at point F.

$$FM = -FN = \frac{j}{\sqrt{3}}$$

times the negative sequence impedance of the system on the relay side of the fault. Should a phase to phase fault on lines 2 and 3 occur at point A on the diagram of Fig. 1, the fault impedance measured would be that represented by the point $A_3$ for line 3 and the point $A_2$ for line 2. Points $A_2$ and $A_3$ may be located in the same manner as the points $F_2$ and $F_3$. Thus, it will be seen in Fig. 1 that the cross-hatched areas $Z_2'$ and $Z_3'$ define the loci of the impedances seen by the relays associated with lines 2 and 3 when a phase to phase fault occurs between those two phases and that these cross-hatched areas represent all fault locations from the relay location A to the arbitrarily selected fault location F. It will also be observed from Fig. 1 that the relay associated with line 2 measures a smaller amount of reactance than the distance to the fault would indicate and that this relay, therefore, would tend to overreach. This undesirable condition, in accordance with my invention, would be accommodated by blocking the relay in phase 2, which is assumed to be the leading phase, when a phase to phase fault condition occurs. It will also be observed from Fig. 1 that the relay associated with phase 3, which phase is assumed to be the lagging phase, would measure more reactance than would actually be indicated by the distance from the relays at point A to the fault at point F and that this relay would tend to underreach. In accordance with my invention, the relay associated with the lagging phase would be effective to cause a tripping operation by the interrupter located at station A. While there is a small amount of error in the distance measurement by the lagging phase relay, this error is small enough to permit selective action of the relays. The error is substantially zero in the following cases, (a) where the circuit resistance is negligible, (b) where ground wires are provided to make a ground return path comparable in impedance to that of the phase conductors, (c) where the fraction of the total positive sequence fault current that flows in the relay is about twice the fraction of total zero sequence current. In the very few cases where the error is enough to prevent tripping the error will be reduced by the opening of the breaker at the other end of the section and sequential tripping will result.

The schematic arrangement shown in Fig. 4 includes conventional directional distance ground relaying means for each of the conductors 1, 2 and 3. The protected portion of the system comprises the lines 1a, 2a, and 3a. Protection for the lines 1a, 2a, and 3a is afforded by the circuit interrupter 7. Generally speaking, each of the conductors 1, 2, and 3 has associated therewith a relay arrangement comprising a starting unit, an ohm unit, and an auxiliary relay. The starting units are directional impedance units having a circular impedance characteristic as shown in Fig. 1. Each starting unit is provided with an operating winding, a restraining winding and a polarizing winding. The operating windings of the starting units derive energy from the conductors 1, 2 and 3 respectively, by means of the current transformers 8, 9 and 10. The restraining winding of each starting unit is energized from the potential transformer 11 by a voltage between a secondary Y-connected winding thereof which corresponds to the line conductor from which the operating winding of a particular ohm unit is energized and the neutral point of the Y winding which preferably should be grounded. The polarizing windings of the starting units are energized by transformer 11 from the voltage between the remaining two conductors of the system. The ohm units are of known construction and comprise a restraining winding which is energized from voltage between ground and the secondary winding of the transformer 11 which corresponds to a particular one of the line conductors. This potential is supplied to the restraining windings of the ohm units by means of auto transformers 12, 13 and 14 through the agency of relays $OX_1$, $OX_2$ and $OX_3$. The ohm units are also provided with operating current windings which are energized by the secondary windings of the current transformers 8, 9 and 10 and by zero sequence current obtained through the agency of the adjustable reactor 6.

The auxiliary relays $A_1$, $A_2$, and $A_3$ are of conventional construction as well as the timing unit TU. The functions of these relays will be described in connection with the operation of the arrangement shown in Fig. 4.

Should a ground fault occur on the conductor 1a, for example, at a point within the reach of the ohm unit OU1 that unit would close its contacts simultaneously with the closing of the contacts of the starting unit SU1. As already explained, the relay would accurately measure the distance to fault F. Operation of the starting unit SU1 would cause positive potential to be applied to conductor 4 and to the coil of relay $A_1$ which relay would operate to energize bridging contact 15a of relay $A_1$, conductor 16, bridging contact 17 of relay $A_2$, conductor 19, the contacts of ohm unit OU1, conductor 20 and conductor 21 to the trip coil of interrupter 7 which would open its contacts. Similarly an appropriate fault on line 2a would cause operation of the starting unit SU2 and of the ohm unit OU2 associated with line 2 and would cause operation of relay $A_2$ to trip interrupter 7 by completing a circuit from positive potential through conductor 22, bridging contact 5 of relay $A_2$, conductor 23, bridging contact 24 of relay $A_3$, conductors 25 and 26 through the contacts of unit OU2 and conductors 20 and 21 to the trip coil of interrupter 7. Should an appropriate fault occur on line 3a, starting unit SU3 and ohm unit OU3 would complete the trip circuit to interrupter 7 through conductor 34, the closed bridging contact 28 of relay $A_3$, conductor 29, normally closed contact 27 of relay $A_1$, lines 30, 30a, the contacts of OU3 lines 20, and 21 to the trip coil of interrupter 7. Thus, the ground relays shown in Fig. 4 would afford precise protection for the lines 1a, 2a and 3a upon the occurrence of a single phase to ground fault which would be within the reach of the relays.

Should a phase to phase fault occur at a point on the system between the points A and F of Fig. 1 which would involve conductors 2a and 3a, unit SU2 and unit OU2 would "see" an impedance within the area $Z_2'$ of Fig. 1 while unit SU3 and unit OU3 would "see" an impedance within the area $Z_3'$ of Fig. 1. Closing of the contacts of these starting units would cause auxiliary units $A_2$ and $A_3$ to operate. The trip circuit to the interrupter 7 is not completed by the unit SU2 and its associated unit OU2 since the bridging member 24 of auxiliary relay $A_3$ is now opened. This circuit comprises the source of positive potential, the contacts of SU2, conductor 22, bridging contact 5 of relay $A_2$, conductor 23, open contact 24 of relay $A_3$, conductors 25 and 26, the contacts of OU2, conductors 20 and 21 and the trip coil of interrupter 7. The trip circuit to interrupter 7 is, however, completed from the source of potential through the contacts of SU3, conductor 34, the bridging contact 28 of relay $A_3$, conductor 29, contact 27 of relay $A_1$ which remains closed, conductors 30 and 30a, the contacts of OU3, conductors 20 and 21. Thus, for a phase to phase fault condition involving only phase conductors 2a and 3a, the starting unit SU3 and the ohm unit OU3 are operable to operate the interrupter since these units are assumed to be in the lagging phase and hence tend to underreach. The starting unit SU2 and the ohm unit OU2 are prevented from initiating a tripping operation since these relays are assumed to be associated with the leading phase and hence tend to overreach as already explained.

As is obvious from Fig. 4, the operation of the other corresponding relays would be identical for a phase to phase fault involving conductors 1 and 3 and for phase to phase fault involving conductors 1 and 2 so that for the usual case the relays associated with the leading phase would be blocked and the relays associated with the lagging phase would initiate a tripping operation. Upon the occurrence of a three phase fault between points A and F of Fig. 1, involving the conductors 1a, 2a and 3a of the transmission line each of the starting units will operate to close its contacts and the ohm units will measure accurately to the point F and close their contacts. Through the closing of the starting unit contacts, the three auxiliary relays $A_1$, $A_2$ and $A_3$ will be energized and close their contacts. The circuits from positive potential through the trip coil of interrupter 7 to cause operation of the interrupter would then be complete for each phase of the relaying. The phase 1 circuit would be completed through SU1 contacts through conductor 4, bridging contact 15a of the $A_1$ element, through bridging contact 24 (top) of the $A_3$ element which will also be operated, through the OU1 contacts and to the trip coil of interrupter 7. The operation of the circuits of the other two phases will be similar to that described above.

For double ground fault conditions, the impedance measured by the relays for a number of typical cases has been determined assuming that the total system impedance when taken as a single impedance between two generating sources is 10 ohms secondary at an angle of 70° lag, and that the zero sequence impedance is three times the positive sequence impedance. The impedance of the protected line section was further assumed to be $0.75 + j2$ ohms secondary and the arc resistance was assumed to be one-half ohm for the positive negative and zero sequence networks. The ground resistance is assumed to be equal to the arc resistance. A quantity C has been used to represent the ratio of the positive or negative sequence current flowing through the relay location to the total positive or negative sequence current in the fault. $C_0$ is the corresponding ratio for zero sequence current. Set forth below are the impedance errors for phases 2 and 3 when these two phases are short circuited to ground.

*Error in ground distance relays with double ground faults*

| Case | C | $C_0$ | $Z_2$ | $Z_3$ |
|---|---|---|---|---|
| I | 1 | 0 | $1.4-j1.01$ | $-.91+j1.01$ |
| II | 1 | 0 | $0.3-j0.27$ | $0.24+j0.27$ |
| III | 1 | 1 | $0.32-j0.11$ | $0.31+j0.12$ |
| IV | ½ | 1 | $0.54-j0.04$ | $0.54+j0.04$ |
| V | .43 | 1 | $0.58+j0$ | $0.58+j0$ |
| VI | 0 | 1 | $0.68+j0.53$ | $0.58-j0.54$ |

The data set forth above are plotted on the impedance diagram of Fig. 2. The heavy line curve represents phase 3 and the lighter line curve represents phase 2. It will be understood that these errors are to be multiplied by a quantity dependent upon the distance from the lagging end of the system in order to obtain quantitative errors for a particular fault location.

From Fig. 2, it will be clear that for a double line to ground fault involving phases 2 and 3, leading phase 2 overreaches for cases I-IV and hence would be blocked in accordance with the arrangement shown in Fig. 4 and that the relay associated with lagging phase 3 would underreach somewhat for cases I-IV and would be allowed to initiate a tripping operation. Both relays measure correctly for case V. Thus, the performance of the relays is such that the relay associated with the lagging phase is used to initiate tripping whether the fault be a double line to ground fault involving two particular lines or a phase to phase fault for cases such as I-IV of Fig. 2.

Fig. 3 is similar to Fig. 1 in that it shows by the cross-hatched areas $Z_2$ and $Z_3$ the impedance conditions seen by the ground directional distance relays associated with lines 2 and 3 for a fault involving ground and lines 2 and 3 and which would be located between points A and F. From Fig. 3 it will be understood that for a fault at F, the relay associated with phase 2 would overreach and hence would be blocked while the relay associated with phase 3 would underreach and hence would be allowed to initiate a tripping operation for the usual case such as I-IV of Fig. 2.

From Fig. 3, it is clear that the ohm unit characteristic, if disposed in known manner as indicated by the line GH instead of as indicated by the line PQ would afford more consistent operation of the relays. A characteristic such as GH in Fig. 3 would also be suitable for the phase to phase fault conditions represented in Fig. 1 as will be obvious from an inspection of those figures.

The operation of the protective system illustrated in Fig. 4 would be the same for a double line to ground fault as for a phase to phase fault which has already been described in connection with Fig. 1. Thus as shown in Fig. 4 the circuit interrupter 7 is provided with electrically operated tripping means having multiple tripping control circuits each respectively under the joint control of the ohm unit and starting unit that are connected to be responsive to faults on a corresponding phase of the system. The auxiliary relays $A_1$, $A_2$ and $A_3$ each are operated upon response of the corresponding one of the starting units $SU1$-$2$-$3$ and have contacts interconnected with the contacts of the other auxiliary relays in the tripping control circuits for completing the corresponding tripping control circuit upon the joint response of the corresponding ohm and starting unit to single phase faults on the corresponding phase while upon double phase faults preventing the completion of a predetermined one of the disconnection control circuits upon the joint response of the corresponding ohm and starting units that are connected to the two phases involved in the double phase fault.

The foregoing description has dealt principally with the usual case where the leading phase relay overreaches for faults involving two of the system conductors. A comparison between this usual case and the rare case where the lagging phase relay overreaches, such as case VI of Fig. 2, can be made by referring to the vector diagrams designated as Figs. 5 and 6. Fig. 5 represents a usual case such as I-IV of Fig. 2, while Fig. 6 represents the rare case VI of Fig. 2.

In Fig. 5, the voltage $E_{1-2}$ represents the line to line voltage between conductors 1 and 2. The voltage $E_{2-3}$ represents the line to line voltage between conductors 2 and 3 and the voltage $E_{3-1}$ represents the line to line voltage between conductors 3 and 1 of the system. The condition represented by Fig. 5 is that which occurs when system conductors 2 and 3 are grounded. The voltages $E_2$ and $E_3$ represent respectively the line to neutral voltages of the Y-connected conductors 2 and 3. The vectors $I_{\phi 2}$ and $I_{\phi 3}$ represent the phase to phase current flowing in the system conductors 2 and 3 respectively, while the two vectors $I_0$ represent the zero sequence ground current. The vectors $I_2$ and $I_3$ thus represent the total current flowing through the system conductors 2 and 3 and hence are representative of the current which operates the ohm units OU2 and OU3 of Fig. 4. From Fig. 5, it will be observed that line to neutral voltage $E_2$, which is the voltage from which the restraining coil voltage for the ohm unit is derived, is disposed at a relatively large angle $\theta_2$ of almost 180° with respect to the operating winding current $I_2$ which inherently results in the measurement of a smaller amount of reactance than the distance to the fault would indicate so that the relay associated with system conductor 2 would tend to overreach and, as already explained, would be blocked in accordance with the arrangement shown in Fig. 4. The angle $\theta_3$ between line to neutral voltage $E_3$ and the current $I_3$ inherently causes the reactance unit associated with system conductor 3 to measure a greater amount of reactance than the distance to the fault would indicate. The relay associated with phase 3 would thus tend to underreach and would not be blocked as already explained.

In Fig. 6, the various vectors are arranged in a fashion similar to the arrangement of the corresponding vectors of Fig. 5. The essential difference between these figures is that the currents $I_2'$ and $I_3'$ of Fig. 6 are made up of a relatively large component of zero phase sequence current $I_0'$. Thus, in the rare case of Fig. 6 the angle $\theta_2'$ between the phase to neutral voltage $E_2'$ of conductor 2 and the total current $I_2'$ is small compared to the relatively large angle $\theta_3'$ between the corresponding quantities of conductor 3. Thus, in Fig. 6, the relay associated with the leading phase 2 should not be blocked but instead the relay associated with phase 3 tends to overreach and hence should be blocked.

A schematic representation of a power system is shown in Fig. 7 for the purpose of illustrating the particular disposition of a relay with respect to the sources of zero sequence current and the sources of generation which will result in relay operating characteristics such as are represented by the vector diagrams of Figs. 5 and 6. In Fig. 7, the generators 35 and 36 are connected to the bus 37 through transformers 38 and 39. A power transformer 40 having a grounded neutral is connected to the bus 41 and in turn to the system conductors 1a, 2a and 3a. The small circles on the diagram of Fig. 7 represent the relay locations $S_1$ through $S_{14}$. The relays located near the transformer 40 and designated by the locations $S_8$ and $S_9$ are representative of the rare case. The source of preponderating zero sequence current is the Y-connected transformer 40 having a grounded neutral. Hence, in accordance with my invention, the lagging phase relay $S_{8-3}$ would overreach and hence would be blocked while the relay $S_{8-2}$ in the leading phase would tend to underreach and accordingly would be allowed to initiate a tripping operation. The relays at $S_9$ would operate in the same manner as the relays at $S_8$.

Relays disposed at locations such as $S_6$ and $S_{11}$ would all tend to measure the distance to the fault accurately since they are more remote from the transformer 40 with the grounded neutral and closer to generators 35 and 36 and hence would not be so influenced by zero phase sequence current. All the relays for the other locations shown in Fig. 7 which are more remote from transformer 40 than relays $S_6$ and $S_{11}$ would operate as in the usual case represented by Fig. 5 and by cases I-IV of Fig. 2. Hence, for such usual cases the circuit shown in Fig. 4 would be used. For relays located such as at $S_6$ and $S_{11}$ none of the phases need be blocked while the relays located at $S_8$ and $S_9$ would be provided with auxiliary relays connected as shown in Fig. 8.

The circuits shown in Fig. 8 and enclosed by dotted lines would simply be substituted for that portion of Fig. 4 which is enclosed by dotted lines and would operate so as to block the lagging phase relay instead of the leading phase relay when a fault condition occurred involving two of the system conductors. Thus, a fault condition which would involve conductors 2a and 3a at a point between relay locations $S_7$ and $S_8$ would cause starting units SU2 and SU3 and ohm units OU2 and OU3 to operate. Ohm unit OU3 would be blocked because the circuit comprising conductor 34 from the contacts of SU3, bridging member 28 of relay $A_3$ which would be closed, conductor 28a, bridging member 17 of relay $A_2$ which would be opened, conductor 30a, the contacts of OU3, and conductors 20 and 21 would not cause operation of interrupter 7 because bridging member 17 of relay $A_2$ would be opened. Relays SU2 and OU2 would, however, cause operation of the interrupter by completing a circuit to the trip coil of interrupter 7 through the contacts of SU2, conductor 22, bridging contact 5 of relay $A_2$, conductor 29a, contact 27 of relay $A_1$, which would remain closed, conductor 26, the contacts of OU2, conductors 20 and 21.

Thus, in accordance with my invention, the relay units which tend to overreach for a fault condition involving the corresponding system conductors are blocked and the relays which underreach are allowed to cause disconnection of the system. If the relay location is such that the relays measure the distance to the fault accurately, it is not necessary to block either of the relays. If during the installation procedure, auxiliary relays such as $A_1$, $A_2$ and $A_3$ were installed for any reason at a location such as $S_6$ and $S_{11}$, it would be immaterial whether such relays were connected as shown in Fig. 4 or as shown in Fig. 8.

As is well understood in the art, the relays shown in Fig. 4 are primarily for the purpose of affording protection for that portion of the transmission line comprising conductors 1a, 2a, and 3a which is represented by the line AB of Figs. 1 and 3. Another relay system as shown in Fig. 4 would be connected to the transmission line at station B and would afford protection for a portion or all of the transmission line between the point B and the point R. As is well known, if the relays at station B should fail to clear a fault along the line BR and within the setting of these relays, back-up protection would be provided by the relays located at station A. To this end, the timing unit shown in Fig. 4 and the auto transformers 12, 13 and 14 are arranged to extend the reach of units OU1, OU2 and OU3 into the zone normally protected by the relays located at station B. More specifically, a fault occurring along the line BR would operate the starting units at station A which operation would energize the operating coil of the timing unit TU. After a predetermined time delay, the timing unit bridging contact 32 would move to the closed position and cause operation of relays $OX_1$, $OX_2$ and $OX_3$ which in turn would reduce the amount of the available potential to the restraining coils of the ohm units at station A thereby increasing the reach of these units so that for a predetermined fault between points B and R, the relays at station A would provide backup protection for the relays located at station B.

Whether the station A relay system shown in Fig. 4 operates in response to a fault between points A and B of Figs. 1 and 3 or whether the system operates after a time delay in response to a fault in the next zone of protection beyond the point B, the principles involved in my invention remain the same so that a single system of conventional directional ground distance relays can be utilized to afford protection against both ground and phase faults.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A polyphase electric power system protective combination comprising ground fault distance measuring means of the reactance type including both a starting unit and an ohm unit connected with each phase respectively to respond to faults and having a system disconnection control shunt circuit jointly closed thereby for effecting disconnection responsively to predetermined single phase-to-ground faults, and a separate auxiliary relay operated by each starting unit respectively upon response thereof to a fault and having contacts interconnected in the disconnection control shunt circuits for preventing the units connected with a predetermined one of two phases involved in a double phase-to-ground fault from effecting disconnection.

2. A polyphase electric power system protective combination comprising a system interrupter provided with tripping means having multiple tripping control circuits, a distance measuring ohm unit connected with each phase respectively to respond to faults thereon and having a cooperating starting unit connected with the corresponding phase to respond to faults thereon, and an auxiliary relay operated by each starting unit respectively upon response thereof and provided with contacts interconnected with the contacts of the other auxiliary relays for interconnecting the corresponding ohm and starting units to close a corresponding one of the tripping control circuits upon the occurrence of predetermined single phase ground faults on the corresponding phase and for preventing the ohm and starting units connected with a predetermined one of two phases involved in a double phase-to-ground fault from closing the corresponding tripping control circuit.

3. A polyphase electric power system protective combination comprising a system interrupter provided with tripping means having multiple tripping control circuits, a distance measuring ohm unit connected with each phase respectively to respond to predetermined faults thereon and having a cooperating starting unit connected with the corresponding phase to respond to predetermined faults thereon, and an auxiliary relay operated by each starting unit respectively upon response thereof and provided with contacts interconnected with the contacts of the other auxiliary relays for interconnecting the corresponding ohm and starting units to close a corresponding one of the tripping control circuits upon the occurrence of predetermined single phase faults on the corresponding phase and for preventing the ohm and starting units connected with the leading one of two phases involved in double phase faults from closing the corresponding tripping control circuit.

4. A polyphase electric power system protective combination comprising a system interrupter provided with tripping means having multiple tripping control circuits, a distance measuring ohm unit connected with each phase respectively to respond to predetermined faults thereon and having a cooperating starting unit connected with the corresponding phase to respond to predetermined faults thereon, and an auxiliary relay operated by each starting unit respectively upon response thereof and provided with contacts interconnected with the contacts of the other auxiliary relays for interconnecting the corresponding ohm and starting units to close the corresponding one of the tripping control circuits upon the occurrence of predetermined single phase faults on the corresponding phase and for preventing the ohm and starting units connected with the lagging one of the two phases involved in a double phase fault from closing the corresponding tripping control circuit.

5. A polyphase electric power system protective combination comprising system disconnecting means having multiple disconnection control circuits, a ground fault directional distance measuring relay of the reactance type including both a starting unit and an ohm unit connected with each phase respectively to respond to single and double phase faults and having a corresponding one of the disconnection control circuits under the joint control of the units for effecting disconnection upon the occurrence of predetermined single phase faults on the corresponding phase, and a separate auxiliary relay operated by each starting unit respectively upon response thereof and having contacts interconnected with the contacts of the other auxiliary relays in the control circuits for completing the corresponding disconnection control circuit upon the joint response of the corresponding ohm and starting unit to single phase faults on the corresponding phase and for preventing the completion of a predetermined one of the disconnection control circuits upon the joint response of the corresponding relays to double phase faults.

ALBERT R. van C. WARRINGTON.

REFERENCES CITED

The following references are of record in the file of this patent:

UNITED STATES PATENTS

| Number | Name | Date |
|---|---|---|
| 1,897,022 | Lewis | Feb. 7, 1933 |
| 2,408,208 | Goldsborough | Sept. 24, 1946 |
| 2,445,429 | Goldsborough | July 20, 1948 |